United States Patent [19]

Grunig

[11] Patent Number: 5,367,146
[45] Date of Patent: Nov. 22, 1994

[54] METHOD AND CIRCUIT ARRANGEMENT FOR MONITORING AND LIMITING THE OPERATING TEMPERATURE OF ELECTRICALLY HEATED EQUIPMENT, AS WELL AS THE USE OF THE METHOD

[75] Inventor: Kurt Grunig, Kuttigen, Switzerland

[73] Assignee: Zehnder Electronic AG, Granichen, Switzerland

[21] Appl. No.: 889,679

[22] Filed: May 28, 1992

[30] Foreign Application Priority Data

Jun. 20, 1991 [CH] Switzerland .................. 828/91-7

[51] Int. Cl.$^5$ ............................................. H05B 1/02
[52] U.S. Cl. ..................................... 219/497; 219/492;
219/506; 219/505; 219/508; 340/589
[58] Field of Search ................ 219/492, 453, 497, 499,
219/501, 505, 506, 508, 486; 340/588, 589

[56] References Cited

U.S. PATENT DOCUMENTS 4,333,004 6/1982 Forgue et al. ...................... 219/497
4,461,951 7/1984 Luoma, II et al. .................. 219/497
4,638,960 1/1987 Straube et al. ...................... 219/497
4,695,709 9/1987 Sachs et al. ......................... 219/494
5,075,537 12/1991 Lorenzen et al. .................... 219/497
5,099,108 3/1992 Kimura et al. ...................... 219/497

Primary Examiner—Mark H. Paschall
Attorney, Agent, or Firm—Schweitzer Corman & Gross

[57] ABSTRACT

A method and apparatus for monitoring and limiting the operational temperature of physical and technical equipment includes supplying a heating device with at least one test pulse of energy and the effect of the test pulse on the temperature course of the equipment is compared to a characteristic operating line that is to be monitored. The comparison dictates where further energy can be supplied to the device or whether the energy supply is to be switched off. Such monitoring and control can be carried out periodically, without interrupting the operation of the equipment. The invention can be used to monitor the degree to which a heater is filled with a heat transfer medium; and is also able to detect impermissible heat dissipation levels.

13 Claims, 4 Drawing Sheets

METHOD AND CIRCUIT ARRANGEMENT FOR MONITORING AND LIMITING THE OPERATING TEMPERATURE OF ELECTRICALLY HEATED EQUIPMENT, AS WELL AS THE USE OF THE METHOD

FIELD OF THE INVENTION

The present invention relates to a method for monitoring and limiting the operating temperature of electrically heated physical and technical equipment with variable heat capacity, the actual temperature of the equipment being measured and monitored by comparison with a nominal temperature, as well as to an apparatus for carrying out the method and the use of the method. The disclosure of Swiss patent application Serial No. 01 828/91-7 of Jun. 20, 1991 is incorporated herein by reference.

BACKGROUND OF THE INVENTION

Heating elements are generally used for physical equipment, technical equipment, heating devices, process technology installations, etc. The operating temperature of these elements frequently increases in an impermissible manner when there is a change in the physical parameters, such as heat storage capacity, conductivity and/or cooling rate of the equipment.

Likewise, the ability of the equipment to function can be impaired, if the intended surface temperature of the heating device is not reached.

With heating apparatuses, particularly radiators, the danger of overheating exists, so that there is danger of fire if the heat-transfer medium, generally water, is present in an insufficient amount in the equipment.

OBJECT OF THE INVENTION

It is therefore an object of the invention to provide a method which permits inadmissible operating temperatures to be recognized at the earliest possible time and the supply of energy to the heating device to be switched off and/or error messages to be generated.

SUMMARY OF THE INVENTION

This objective is accomplished by the present invention in which, in the method aspect, the actual temperature of the equipment is measured. A defined amount of heating energy is then supplied during a defined time interval to the equipment heating device. After a temperature equilibration time, the actual temperature of the equipment is measured once again. In the event of deviation of the measured temperature change from a nominal value range the supply of energy to the heating device is interrupted. If the temperature rise lies within the nominal range of values, energy is again supplied to the heater during at least one further interval of time.

The circuit arrangement for carrying out the method is characterized in that the output of a reference temperature value setter as well as the output of a test energy generator, is provided to a gate circuit. The gate permits the choice of outputs to be supplied to a first input of a comparator, while the second input of the comparator is connected to the output of the actual temperature measuring device. The comparator is used to control the operation of the heating element. In addition, control means direct the periodic application of the defined amount of heat energy and permits the analysis of the actual temperature of the equipment during test conditions.

Use of a digital value setter makes it possible to effect the input of nominal values easily. Increasing the nominal temperature value range for testing purposes by, in each case, a constant value over the warm-up process for the heater, represents a particularly efficient means of monitoring operation.

The present method permits equipment to be checked periodically for functional reliability without having to interrupt the operation of the equipment. Upper and a lower permissible nominal values can be fixed experimentally and integrated in a simple manner in the monitoring system by adjusting the switching threshold. Because a permissible limiting temperature can be assigned, overheating of the heating apparatus is prevented by the monitoring test itself.

Further sensors, such as flow monitors, thermocouples, etc. may be included in the apparatus, permitting existing heat capacities or thermal conductivities as well as the determination of impermissible heat dissipation, to be included in the monitoring in a simple manner.

A preferred use of the present invention relates to the monitoring of the amount of heat transfer medium in a heater and has proven its value particularly in connection with towel radiators or heaters.

The monitoring of time-dependent heat dissipation is of general importance, particularly for applications in process technology, when changes in state, such as the occurrence of a vapor phase and/or leakage losses and/or mass changes, must be taken into consideration when controlling the heating device.

DETAILED DESCRIPTION OF AM EMBODIMENT OF THE INVENTION

Figure 1:
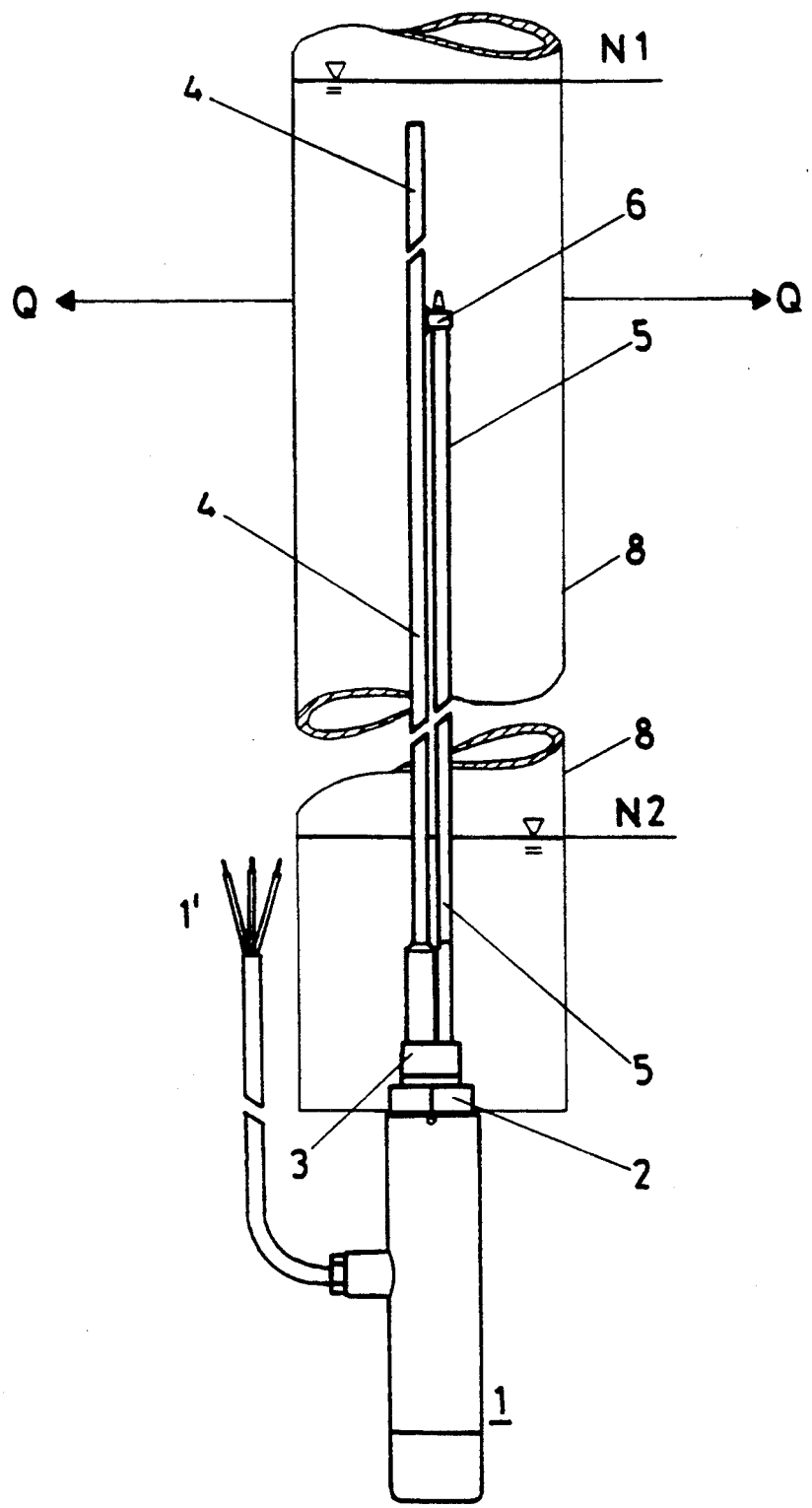
FIG. 1 shows a simplified hand towel heater with a heating element.

As presented in FIG. 1, a heating device 1, such as may be used in a device to warm hand towels, is depicted. As shown, the active portion of the heating device is a heating element or heating cartridge. The cartridge is mounted co-axially in the lower region of heater unit 8 by means of a mounting nut 2 on a flange 3. A heating rod 4 and a somewhat shorter parallel sensor rod 5 extend into a heat transfer medium carried within the heating unit. The sensor rod 5 is supported adjacent the heating rod 4 by a bearing ring 6 and contains, as a measuring element, a conventional, commercial, temperature-dependent resistance (PTC resistance, Philips type KTY83).

As shown, the heat transfer medium may consist of water; a permissible, upper filling level for the heat transfer medium is labeled N1 and an example of an impermissible low level is labeled N2. The amount of heat radiating radially into the air is characterized by the arrows Q.

Electrical energy is supplied to the heating device over a mains connection 1', which is connected with the circuit arrangements of FIGS. 3 and 4 by way of a monitoring circuit, as will be described.

Figure 2:
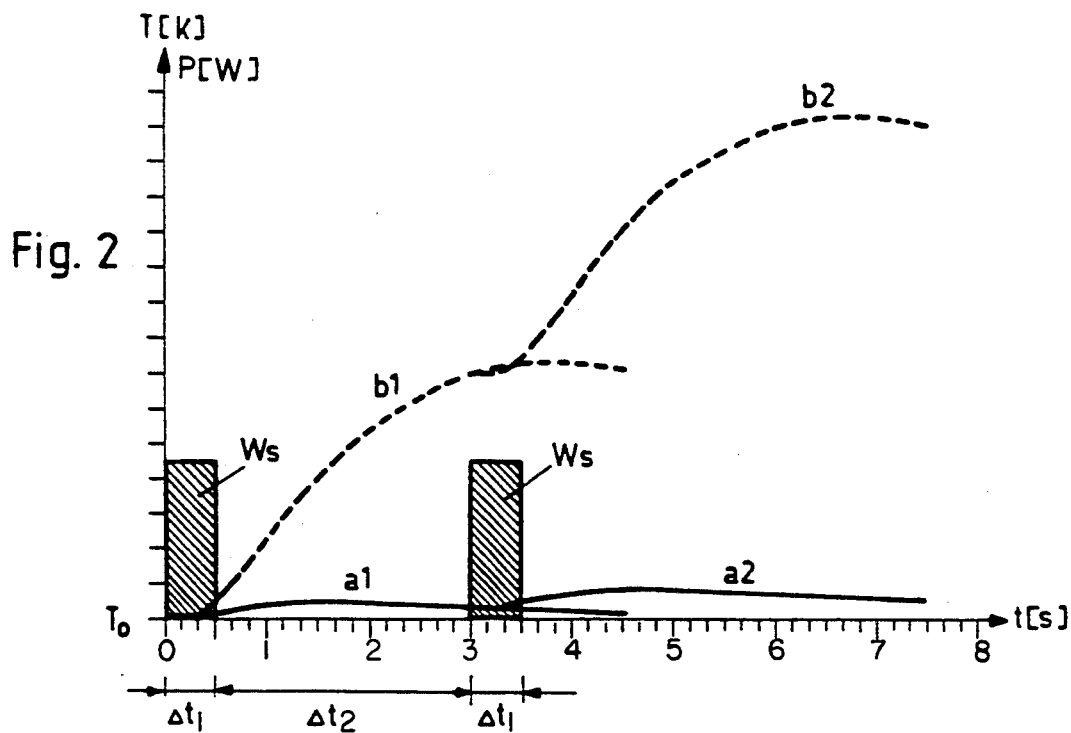
FIG. 2 is a graph of a representative characteristic course of the initial operating temperature of equipment monitored pursuant to the invention.

A plot of the operating temperature of a typical piece of apparatus has a characteristic course which is represented in FIG. 2. The abscissa represents the time in seconds; the ordinate represents the temperature in degrees Kelvin or the supplied heating power P in watts.

If an energy pulse $W_s$ is supplied to the equipment during the time $\Delta t_1$, the temperature of the equipment, having a given heat capacity and a corresponding thermal conductivity behavior, increases slightly from room temperature $T_0 = 293°$ K. in accordance with curve $a_1$, thereafter declining asymptotically to room temperature in accordance with the radiation behavior of the equipment. If a further pulse $W_s$ of heating energy is supplied after a so-called temperature equilibration time $\Delta t_2$, the temperature at the measuring site increases corresponding to $a_2$, only to decline to ambient once again.

If the heat storage behavior of the equipment does not agree with calculated permissible values, for example, because the heat transfer medium is not present or is present in an insufficient amount, the temperature of the equipment may vary from nominal, as indicated by $b_1$ and $b_2$. Such plots indicate that the equipment may become overheated in an impermissible manner upon continued operation.

In accordance with the present invention, such overheating is avoided since a temperature which is outside of the permissible nominal range is detected before a second pulse of energy is supplied and the supply of current to the heater is interrupted.

Figure 3:
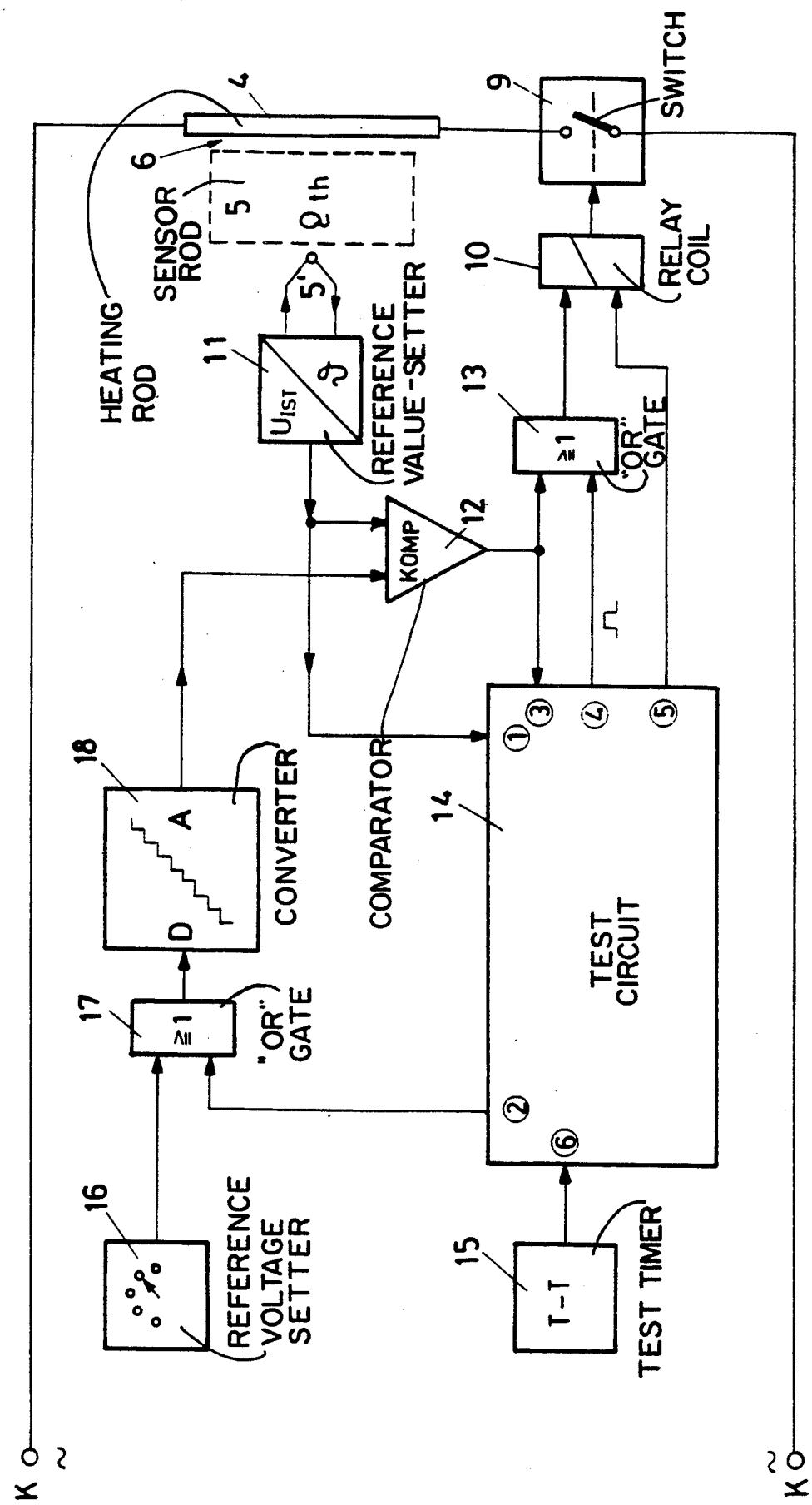
FIG. 3 shows a circuit arrangement for monitoring the operating temperature of the heater of FIG. 1 in accordance with the present invention.

The circuit arrangement of FIG. 3 contains the monitoring system for a heater in the presence of a heat transfer medium. In its expanded form of FIG. 4, this circuit arrangement can additionally recognize and signal if the flow through the heater is excessive, for example, when a valve is open, or if the heater is cooled excessively.

As shown in FIG. 3, the voltage applied to the heater coil of the heating rod 4 of FIG. 1 is the terminal voltage K, which is the alternating current voltage of the mains supply. Switch 9 is in series with the heating rod, and is controlled by a relay coil 10. The sensor rod 5 is mounted on the heating rod 4 and is thus thermally coupled to it, as symbolized by $\int$ th. A PTC resistance serves as the active element of a sensor; its resistance is converted in a known manner into a voltage $U_{IST}$ by value setter 11.

The output of the value-setter 11 is compared by comparator 12 to a reference voltage developed by digital-to-analog convertor 18. Convertor 18 has applied to its input either a reference value developed by nominal or reference value setter 16 or a reference value developed by test circuit 14. As presented, the output of reference value setter 16 and test circuit 14 is preferably digital, representing a desired temperature value. These digital representations are converted to a voltage level by converter 18 as known in the art. The choice of input to the convertor is controlled by "or" gate 17, the operation of which may be controlled by test circuit 14.

When the reference voltage setter 16 is connected to the convertor 18 and then to comparator 12, the apparatus functions in a conventional manner; the temperature of the heater as sensed by the sensor rod 5 is compared to a reference temperature value as set by reference value-setter 11. The comparator 12 provides an output which is passed through a gate 13 to relay coil 10 which permits relay contacts 9 to be engaged, sending current to the heater element 4. Such operation may be continuous, or may be in an intermittent or pulsed manner, depending on the mode of operation for gate 17.

Because in conventional operation the comparator 12 provides an output only when the reference temperature is below that of the heater, it does not provide any indication of malfunction. Accordingly, the output of value-setter 11 is also passed to test circuit 14. Through test timer 15, output 2 of the test circuit is activated on a periodic basis, "or" gate 17 permitting the output to pass to the convertor 18 and thus to comparator 12. Because the output 2 is controlled both as to magnitude and time, so long as its magnitude is above the temperature of the heater as sensed by sensor rod 5, comparator 12 will operate and allow mains energy to be passed to the heater. The amount of energy received by the heater rod 4 during a test cycle is thus known. And as the thermal load represented by the heater is known, a proper expected temperature rise resulting from the known amount of energy can be calculated.

By monitoring the sensed temperature at terminal 1, test unit 14 determines whether the sensed temperature rise resulting from the applied test energy corresponds to proper operation, or indicates that system operation is not normal, e.g. that the heater bath level is below proper levels, resulting in an above normal and expected temperature rise. Such testing can be performed on a periodic basis, governed by test-timer 15, until the sensed temperature corresponds to the reference value provided to the comparator, as at that level the comparator changes state and prevents additional energy to be passed to the heater. This change of output state is sensed at test circuit terminal 3 and permits the test routine to be halted.

If an out-of-range condition is sensed, test circuit 14 provides an interrupt or lockout signal at terminal 5 to the relay 10 to prevent the application of further energy to the heater. If a sufficiently low temperature is sensed, it may similarly apply a priority signal on line 4 through a gate 13 to the relay, to supply energy to the heater on a priority basis if comparator 12 is for some reason inoperative or if timed operation of gate 17 cannot raise the temperature as required.

This relatively simple circuit arrangement makes it possible to reliably detect whether the sensor rod 5, and thus the heating apparatus, has heated up impermissibly by comparing the temperature, which is detected with the PTC resistance 5', with the nominal temperature that is to be expected.

Figure 4:
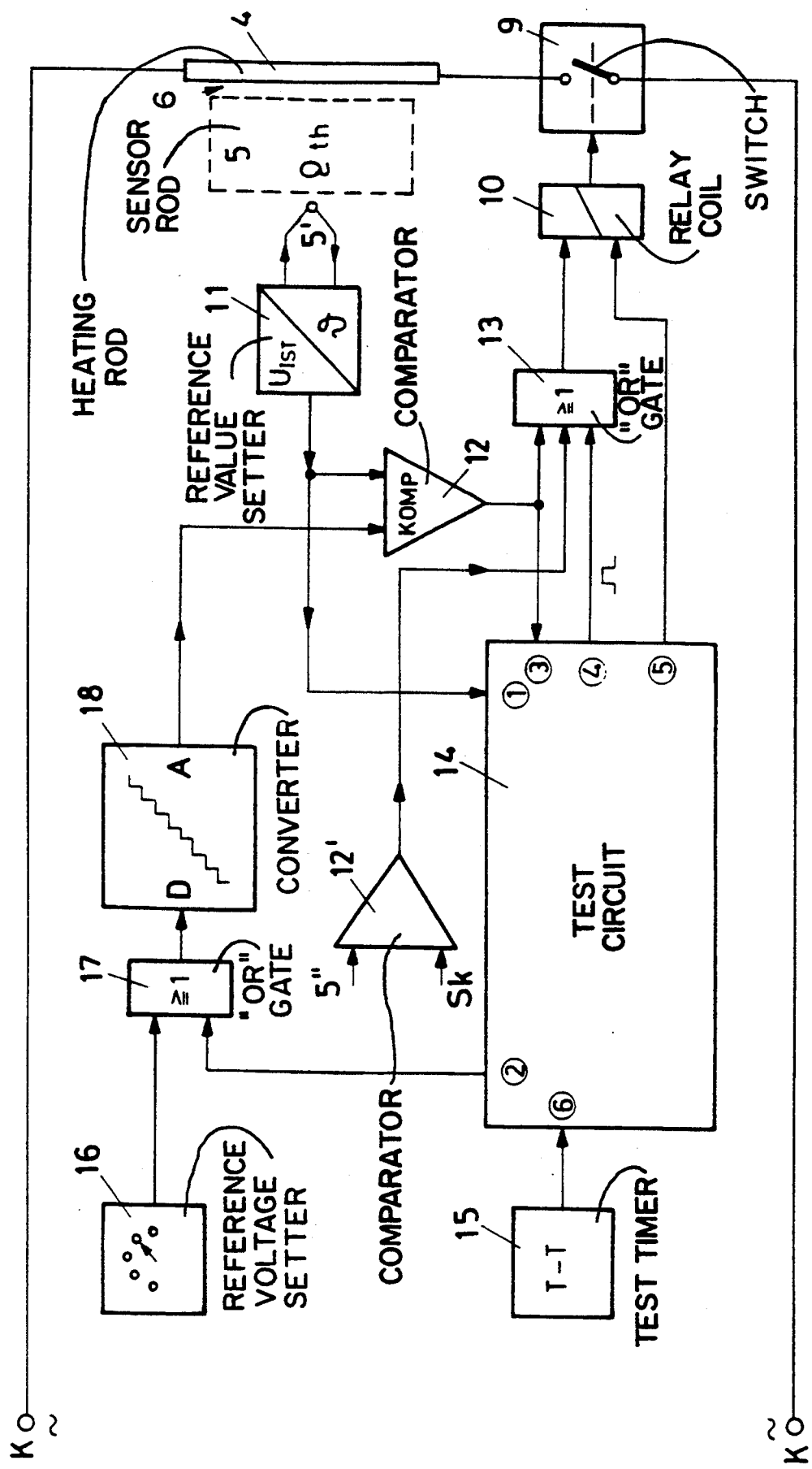
FIG. 4 depicts a circuit arrangement for monitoring the operating temperature of an additional element.

The circuit arrangement of FIG. 4, which has been expanded compared to that of FIG. 3, has an additional comparator 12', which is similar to comparator 12. The comparator 12' compares temperature values measured at an additional sensor 5'' with the appropriate reference value $S_k$. The output of the comparator is coupled to an additional input of the gate circuit 13. This allows control to be provided based on sensed temperatures at a variety of locations. The sensor 5'' may be a thermocouple, which can monitor the water temperature of the heating device for comparison to a specified minimum.

For the sake of simplicity, only circuitry for application and cutoff of the energy supply to the heating rod 4 is shown in FIGS. 3 and 4; it is obvious that error messages can be generated in an analogous manner and transmitted to a suitable receiver.

Figure 5:
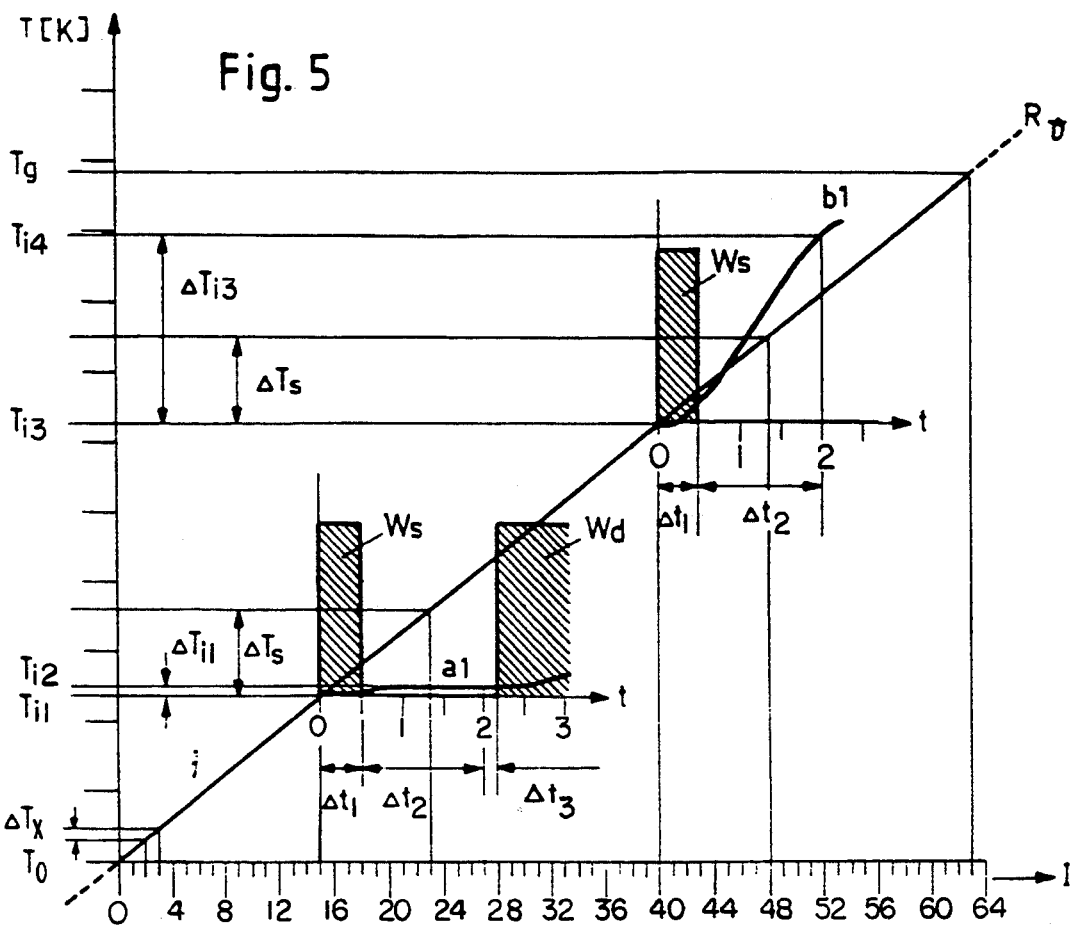
FIG. 5 is a plot of the representative operational behavior of the inventive heater of FIG. 1 controlled by the present invention.

FIG. 5 illustrates performance of the present invention, and shows 64 time increments I on the abscissa; the temperature T is plotted on the ordinate in °K. A characteristic temperature line R $v$ of the PTC resistance 5' of FIG. 3 is shown from normal room temperature $T_o = 278°$ K. up to the limiting temperature $Tg = 343°$ K. linearly in a simplified fashion. Two test examples have been drawn on this characteristic line. The following is a key for the reference symbols:

- $a_1$ course of the temperature with a heat transfer medium
- $b_1$ course of the temperature without a heat transfer medium
- I time increments
- R characteristic temperature line (PTC)
- $T_o$ (lowest) room temperature
- $tv$ time axis
- $\Delta t_1$ time interval for application of test energy
- $\Delta t_2$ temperature equilibration time
- $t_3$ operating time of heating device
- $\Delta Tx$ temperature increment (constant)
- $W_s$ energy applied during test
- $W_d$ energy applied during operation
- T absolute temperature
- $Ti_1$ actual temperature at time 1
- $Ti_2$ actual temperature at time 2
- $Ti_3$ actual temperature at time 3
- $Ti_4$ actual temperature at time 4
- Tg limiting temperature of heating device
- $\Delta Ti_1$ temperature change
- $\Delta Ti_3$ temperature change
- $\Delta T_s$ first nominal range value During a time $t_1$ a controlled amount of energy $W_s$ is applied to the system, which is at temperature $Ti_1$. With the heat transfer medium in place, the temperature of the system rises over time $\Delta t_2$ to temperature $Ti_2$. As this temperature is within the permissible calculated temperature rise zone $\Delta T_s$, operation of the system is deemed normal, and normal operating energy $W_d$ is continued to be applied to heat the apparatus in the normal course of operation.

In the event that the heat transfer medium is lost, the application of a test energy pulse during a time $\Delta t_1$ results the sensed temperature rising as in $b_1$. This temperature rise $\Delta Ti_3$ exceeds the limit $\Delta T_s$, and causes an alarm condition, allowing the input of normal operating energy $W_d$ to the heater to be interrupted.

The energy $W_s$ used for the test can be minimized in such a way, particularly if the sensor is arranged on the heating element, that the operating behavior of the equipment which is to be monitored is not interfered with by any significant manner, even with the application of periodic tests at different temperature levels as the temperature of the heater rises to its final operating level.

The invention may be used to advantage in equipment of the type in which a constant heat output is designed for a maximum value, which is selected on the basis of safety consideration. It can, however, also be used in many other controlled heating devices to increase the operational safety of such devices by periodic testing during operation. By use of appropriate known microprocessor technology to control and operate the test circuit and timer, efficient supervision of such devices may be conducted.

I claim:

1. A method for monitoring and limiting the operational temperature of an electrically heated device whose temperature is normally regulated by the application of heat energy derived from a primary energy source on a continuing basis so long as the temperature of the device is below a reference whereby operation of said primary energy supply is controlled, comprising the steps of:
   a) disconnecting said primary energy source from said device;
   b) measuring the actual temperature of the device;
   c) supplying a defined amount of heating energy to the device heater over a momentary time interval;
   d) measuring the resulting temperature rise of the device after an appropriate equilibrium time;
   e) comparing the temperature rise to a reference range; and
   f) maintaining the disconnected state of the primary energy source if the temperature rise is outside the reference range and reconnecting said primary energy source to said heater if the temperature rise is within the reference range.

2. The method of claim 1 further comprising an initial step of choosing a device temperature range over which monitoring is to be accomplished and dividing said range into a plurality of equal segments; and the further step of repeating steps a through f on a periodic basis, wherein said reference temperature range for each repetition of repeated steps is chosen to correspond to a chosen nominal value of one of said segments.

3. The method of claim 2, wherein the reference range values are incremented by a constant value to a new value for each of said groups of repeated steps.

4. The method of claim 1, wherein said reference range values are limiting values of acceptable temperature rise calculated under permissible operating conditions of the device that is to be monitored.

5. The method of claim 1, comprising the further step of terminating the supply of all energy to the device when a permissible high limit temperature for the device is measured by step d.

6. The method of claim 1, wherein said primary energy source operates on a continuous pulsed basis, comprising the repetition of steps a) through f) in a periodic manner so long as said temperature rise of a step d) is within the associated reference range, a subsequent repetition of said steps being performed after said primary energy source is reconnected for a time sufficient to pass at least one of said primary energy source pulses to said device.

7. In a heating apparatus of the type in which a signal representing the actual temperature of the apparatus is compared to a desired reference temperature signal by comparison means, the output of said comparison means being utilized to allow the passage of heater current to an electrically-operated heating element so long as the actual temperature of the apparatus is below the reference temperature, an improvement for monitoring the performance and limiting the operational temperature of the heating apparatus, comprising:
   means for generating a test signal representing a predetermined quantity of energy;
   means for interrupting the passage of heater current to said heater element and passing said predetermined quantity of energy to said heater element in lieu thereof;

means for measuring the increase in temperature of said apparatus in response to said application of said predetermined quantity of energy;

means for comparing said increase in temperature to a calculated expected temperature increase value range representing normal operation of said heater; and means for maintaining the interruption of the passage of heater current to said heater element in the event said comparison indicates an out-of-range value.

8. The apparatus of claim 7, wherein said means for interrupting the passage of heater current comprises means for interrupting said heater current on a periodic basis.

9. The apparatus of claim 8 wherein said interrupting and passing means comprises an or gate having a first input for said reference temperature signal and a second input for said test signal, and an output coupled to said temperature comparison means.

10. The apparatus of claim 9, wherein said test reference and reference temperature signals are in digital format and said gate output is coupled to said temperature comparison means through a digital to analog convertor.

11. Apparatus for monitoring the operation of a heating device having an electrical heater element, comprising: primary energy means for providing energy to the heater element;

secondary means for passing a measured amount of electrical energy to said heater element;

switch means for selectively connecting one of said primary energy means and said secondary means to said heater element;

means for measuring a temperature rise of said heating device in response to said measured amount of electrical energy when said secondary means is connected to said heating device;

means for comparing the measured temperature rise to a reference; and means for generating a control signal for said switch means representing the results of said comparison.

12. The apparatus of claim 11 wherein said passing means comprises mean for passing said energy on a periodic basis.

13. A method for monitoring and limiting the operational temperature of an electrically heated device whose temperature is normally regulated by the application of heat energy derived from a primary energy source on a continuing basis so long as the temperature of the device is below a reference whereby operation of said primary energy supply is controlled, comprising the steps of:

a) disconnecting said primary energy source from said device;

b) measuring the actual temperature of the device;

c) supplying a defined amount of heating energy to the device heater over a momentary time interval;

d) measuring the resulting temperature rise of the device after an appropriate equilibrium time;

e) comparing the temperature rise to a reference range; and f) reconnecting said primary energy source to said heater if the temperature rise is within the reference range and providing a signal representing the direction of deviation if the temperature is outside the reference range.

* * * * *